July 26, 1966 G. D. BOEHLER ET AL 3,262,656
WING ROTORS
Filed Oct. 21, 1964 5 Sheets-Sheet 1
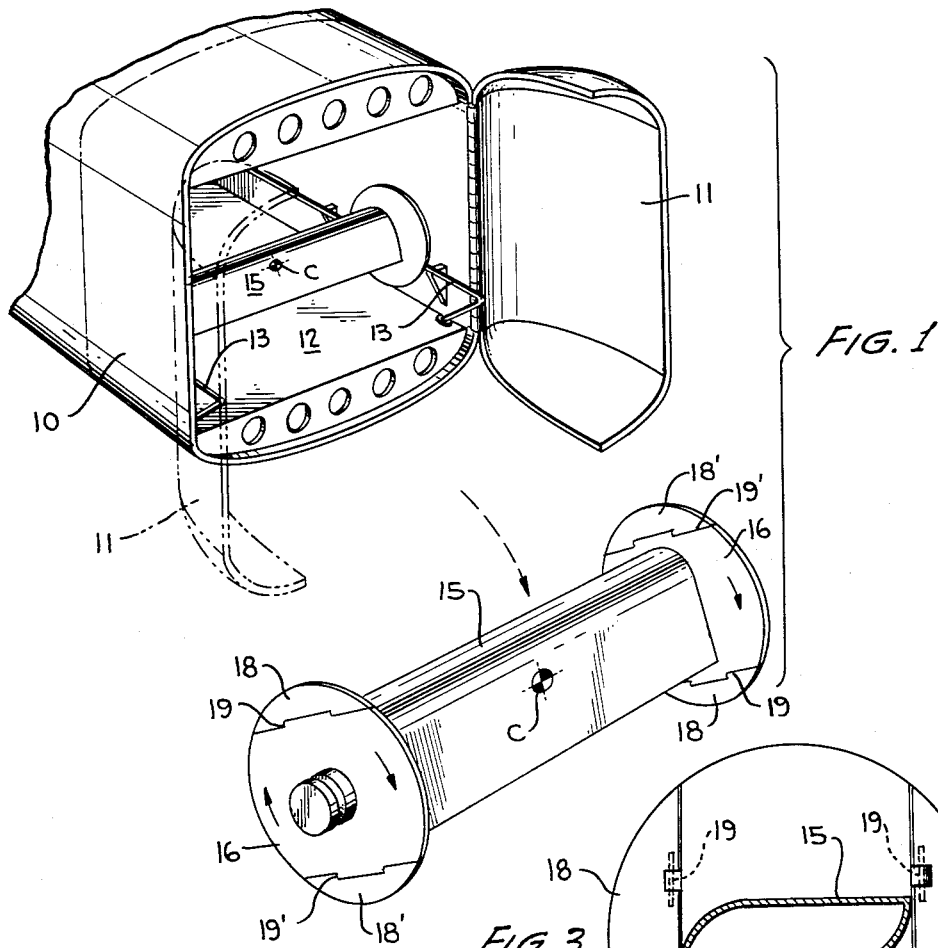
FIG. 1
FIG. 3
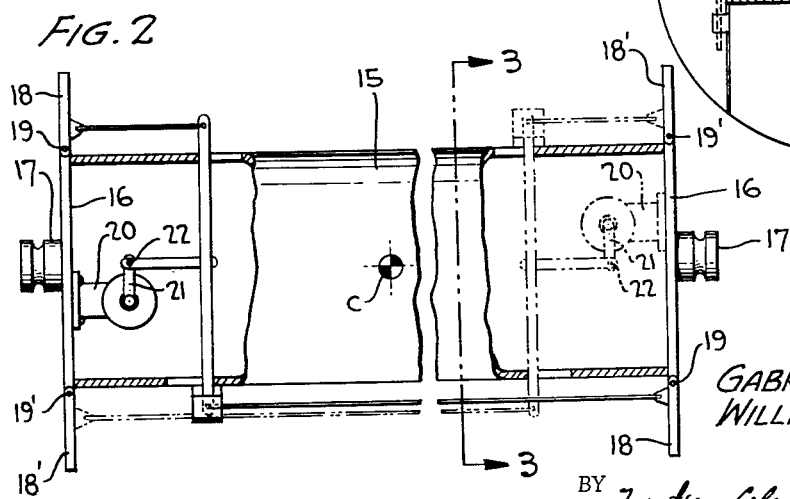
FIG. 2
INVENTORS,
GABRIEL D. BOEHLER
WILLIAM F. FOSHAG
BY Watson, Cole, Grindle & Watson
ATTORNEYS

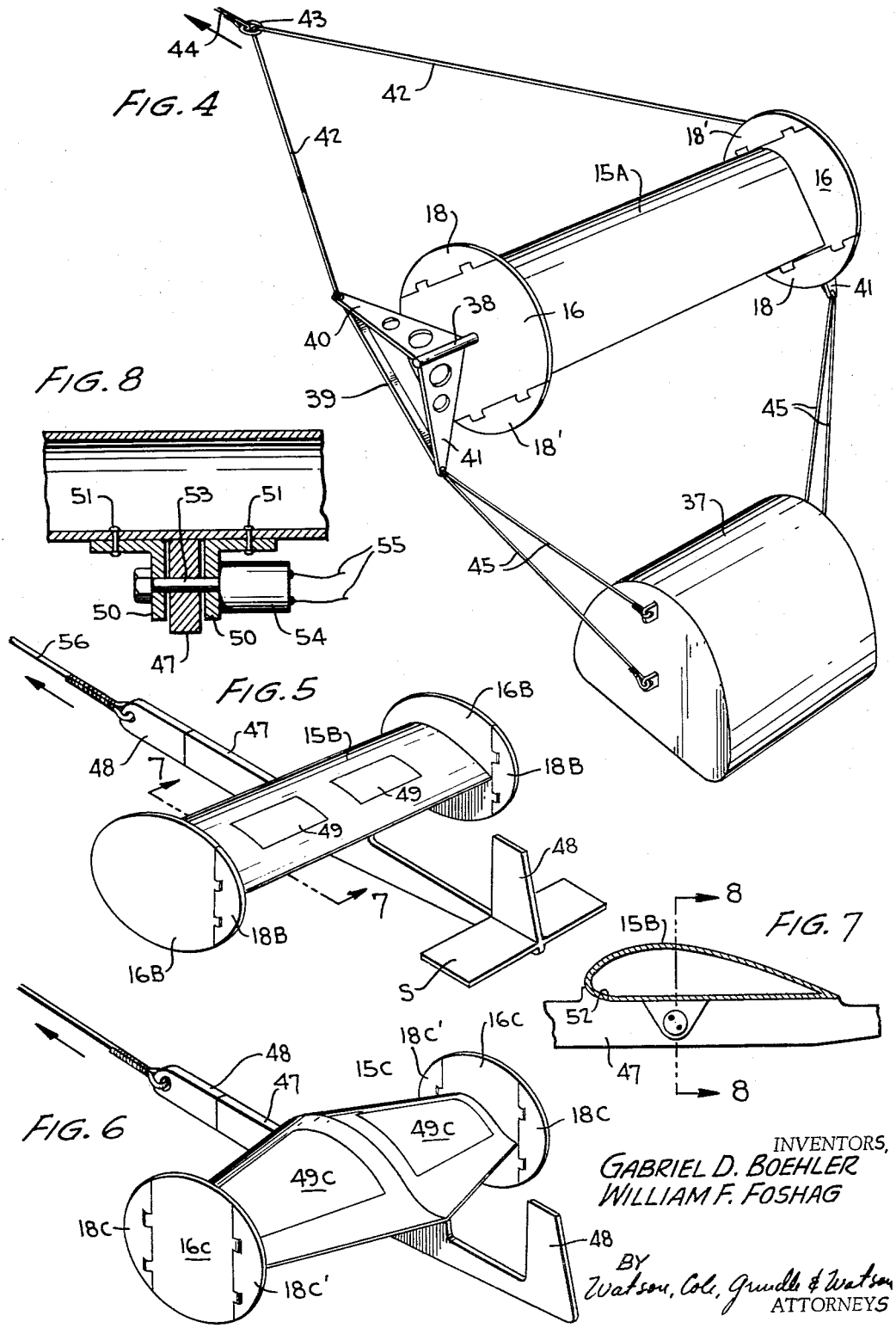

July 26, 1966 G. D. BOEHLER ET AL 3,262,656
WING ROTORS
Filed Oct. 21, 1964 5 Sheets-Sheet 3
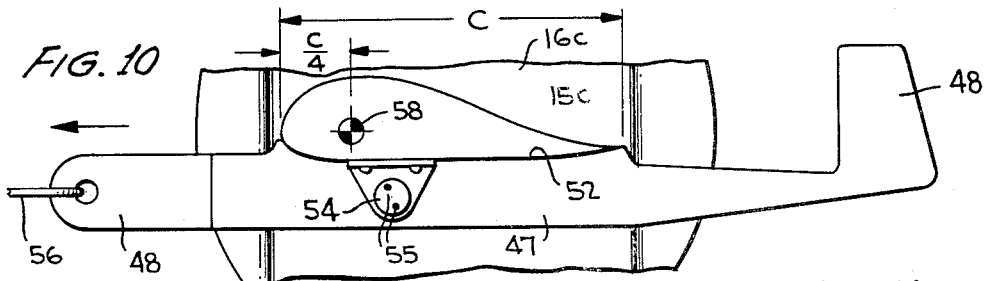
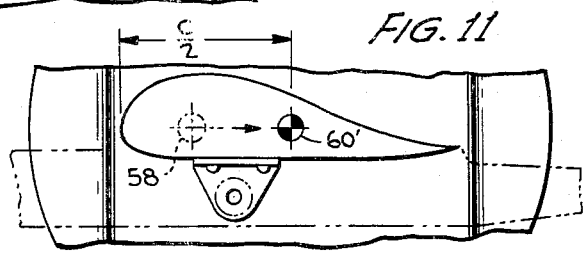
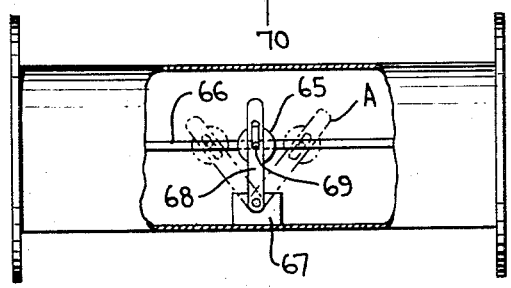
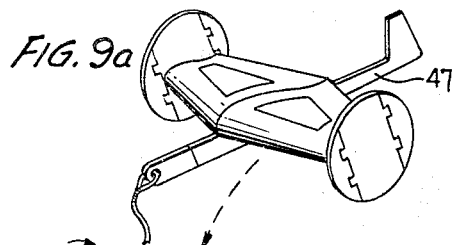
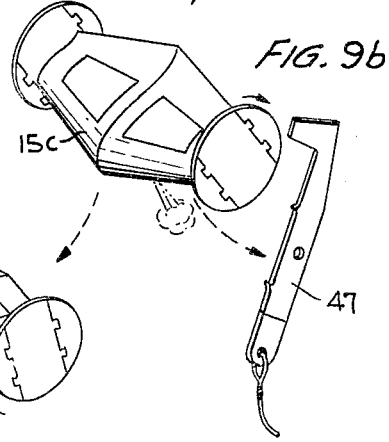
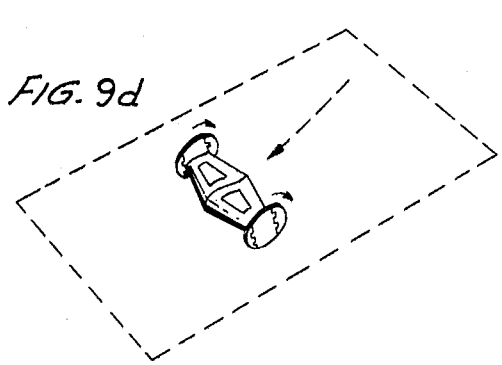
INVENTORS,
GABRIEL D. BOEHLER
WILLIAM F. FOSHAG
BY Watson, Cole, Grindle & Watson
ATTORNEYS July 26, 1966  G. D. BOEHLER ET AL  3,262,656
WING ROTORS Filed Oct. 21, 1964  5 Sheets-Sheet 4

INVENTORS,
GABRIEL D. BOEHLER
WILLIAM F. FOSHAG

BY *Watson, Cole, Grindle & Watson*
ATTORNEYS

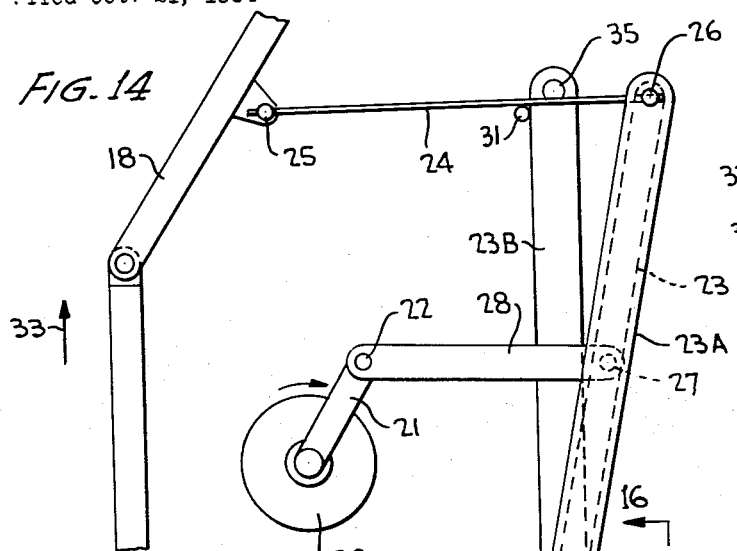
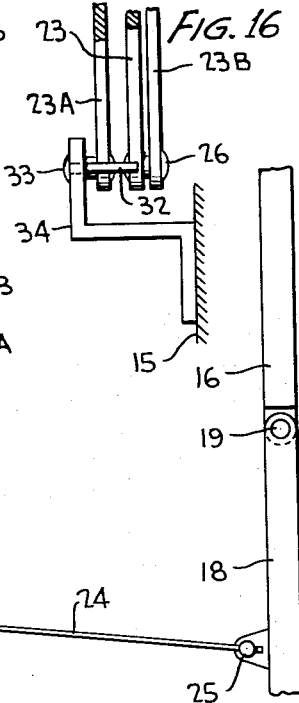
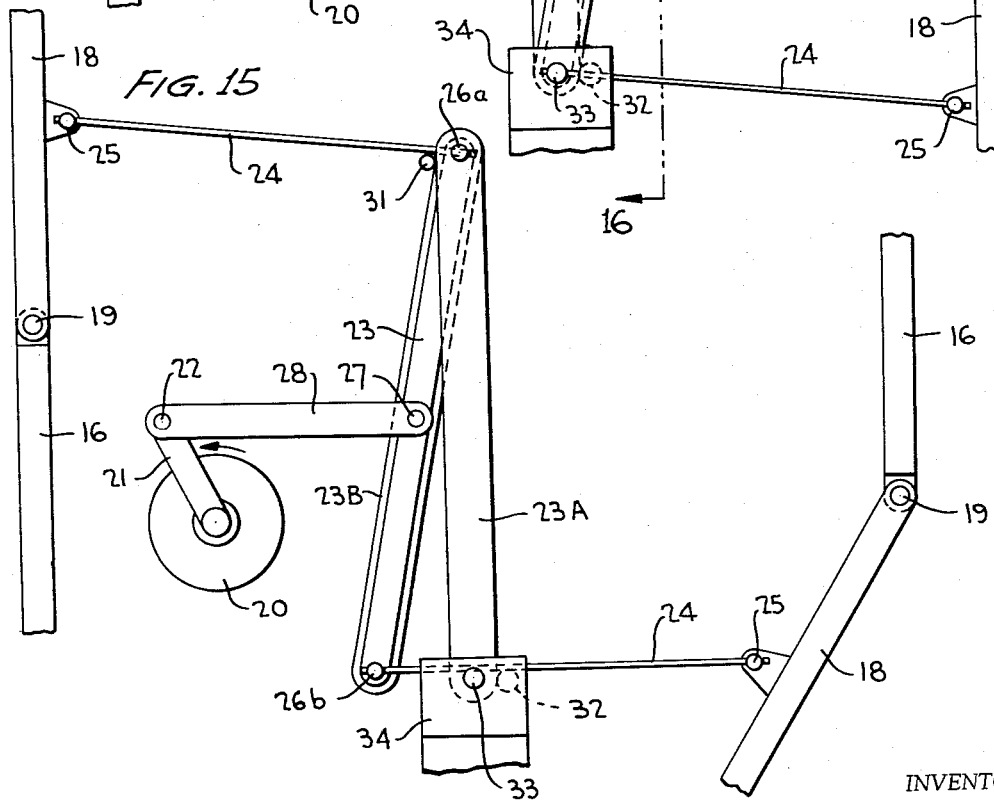
July 26, 1966    G. D. BOEHLER ET AL    3,262,656
WING ROTORS
Filed Oct. 21, 1964    5 Sheets-Sheet 5
INVENTORS,
GABRIEL D. BOEHLER
WILLIAM F. FOSHAG
BY Watson, Cole, Grindle & Watson
ATTORNEYS United States Patent Office 3,262,656
Patented July 26, 1966

3,262,656
WING ROTORS
Gabriel Dominique Boehler and William Frederick Foshag, Washington, D.C., assignors to Aerophysics Company, Washington, D.C., a corporation of the District of Columbia
Filed Oct. 21, 1964, Ser. No. 405,420
23 Claims. (Cl. 244—10)

This invention relates to improvements in aircraft of the wing rotor type. For the purpose of this application, a wing rotor is defined as a wing which, in addition to moving through the air, rotates about an axis extending span-wise thereof, as distinguished from rotating wing of the more generally known type such as employed in helicopters or autogiros in which the wing rotates about a substantially vertical axis normal to its span. While the present application is for the most part directed to aircraft in which movement through the air causes the wing to autorotate, it also envisions aircraft in which the rotating wing is power driven.

It has been found that such wing rotors when formed of suitable shapes, have qualities rendering them potentially superior to fixed-wing gliders for aerial cargo delivery purposes. Specifically, because of the gyroscopic effect resulting from rotation, they possess inherent stability. They have great load-lifting capabilities, are virtually stall-proof, and are adapted to glide and land at slow speeds. In addition, they involve no risk of failure to deploy; they remain stable under adverse conditions and are capable of landing without damage in substantial winds, as contrasted, for instance, to parachutes.

Since a wing rotor of suitable size for air cargo delivery may be economically fabricated, and is otherwise well suited for the purpose, its use for air cargo delivery, if feasible, would appear highly desirable.

However, while autorotating wings, or wing rotors, have heretofore been known, there has been no known effective way for stabilizing and controlling such wing rotors in free flight, except by rotatably connecting them to a non-rotating fuselage or frame equipped with generally conventional aerodynamic control surfaces and means.

With the foregoing considerations in mind, it is a primary object of the invention to provide an autorotating wing or wing rotor type of aircraft, as above defined, which is capable of controlled free flight as well as subject to control while constituting a rotary wing structure of a more conventional aircraft, and in which the control means are carried by and rotate with the wing rotor, thereby dispensing with the necessity for a non-rotating fuselage or frame.

For achieving these objects, it has been found that yaw control or steering of the wing is achievable in a variety of ways, as for instance by shifting the center of gravity of the wing in a span-wise direction to bring into action gyroscopic or dynamic forces which may be employed for control purposes or, by the use of more conventional aerodynamically operating means such as ailerons or control surfaces arranged to create control forces. Further, such aerodynamically operating means and gyroscopic forces may be utilized simultaneously to create a resultant controlling force.

Similarly, control of the rate of descent or, in other words, the glide path angle of the aircraft, may comprise suitable drag modulation r.p.m. means, which again may comprise ailerons actuated in unison to the extent necessary to increase the angle of descent.

For decreasing the rate of descent (as well as for providing powered flight, if desired) there may be provided suitable lift modulating means such as selectively operable reaction motors or rockets affixed to the wing structure at radially spaced locations from its rotational axis and oriented to discharge in a generally circumferential direction with respect to the axis. A further specific and novel lift modulating means envisioned by the invention may comprise inertia weights spaced at radially remote locations from the rotational axis of the wing, together with selectively operated means for drawing them inwardly toward such axis.

While the inherently slow speed and comparatively great drag of the wing rotor may constitute a disadvantage under certain conditions, as for instance where it is desired to tow the wing rotor as a glider behind a conventional fixed wing aircraft, it has been found possible in accordance with the invention to overcome this by a novel adaptation of the wing structure to render it convertible, while in free flight, from operation in the manner of a conventional fixed wing to operation as a wing rotor as defined earlier in this application.

It has been found that a wing of conventional airfoil cross-section may be caused to convert from one type of operation to the other by shifting of its center of gravity parallel to its line of flight.

It is accordingly a further primary object to provide an aircraft sustaining wing, together with means for shifting the center of gravity of the wing in the direction of its line of flight, from a position in which the wing is stabilized for operation in the manner of a conventional fixed aircraft wing to a position in which the wing is caused to autorotate by aerodynamic action for operation as a wing rotor.

In the preferred form of convertible wing structure, the means for shifting the center of gravity may comprise a detachable or jettisonable boom supporting the weight or mass, preferably in advance of the leading edge of the wing, to shift the center of gravity of the aircraft as a whole substantially forwardly from the normal center of gravity of the wing per se, whereby jettisoning of the boom will automatically effect rearward shifting of the center of gravity.

A further feature of the invention consists in the utilization of the already existing yaw control and drag modulation means or mechanisms of the wing rotor for also affording control of the wing structure in its fixed wing mode of operation.

The boom, moreover, may afford the further functions of a skid for takeoff purposes, a tow line connection at its forward end, supporting means for a conventional vertical tail fin for directional stabilization during towing and, if desired, for stabilizing tail surfaces.

Further incidental features, objects and advantages of the invention will be apparent from the accompanying drawings and descriptions of specific exemplifications of the invention, in conjunction with the accompanying drawings:

FIGURE 1 is a fragmentary perspective view of the open rearwardly directed end of the cargo-carrying body or fuselage of a conventional air transport, showing one wing rotor as it appears immediately after launching from said transport, and a further such wing rotor in the process of being launched.

FIGURE 2 is an enlarged plan view of a wing rotor such as shown in FIGURE 1, with one end broken away to show diagrammatically certain of the control mechanisms in the hollow interior of the structure.

FIGURE 3 is a cross-section on the line 3—3 of FIGURE 2.

FIGURE 4 is a perspective view of a modification of the invention in which it is adapted for towing behind a helicopter with a cargo carrying body suspended beneath the wing.

FIGURE 5 is a perspective view of a still further modification in which the wing rotor is adapted for use with a jettisonable fuselage or boom to function as the fixed wing of a towable glider, and convertible by jettisoning of the fuselage to operation as a wing rotor.

FIGURE 6 is a perspective view similar to FIGURE 5 in which the wing structure assumes a generally conventional flying wing configuration permitting the elimination of the horizontal stabilizer surfaces on the jettisonable boom, such as are provided in the structure of FIGURE 5.

FIGURE 7 is a section on the line 7—7 of FIGURE 5 showing a conventional airfoil configuration adaptable for use in wing structures of the invention.

FIGURE 8 is an enlarged fragmentary section on the line 8—8 of FIGURE 7 showing the jettisoning connection between the wing structure and fuselage.

FIGUES 9A to 9D respectively are a series of perspective views of a convertible fixed wing-to-wing rotor device such as shown in FIGURE 6, showing sequentially various of the stages in its conversion and its subsequent controlled flight toward a target area.

FIGURE 10 is a diagrammatic fragmentary view of the glider structure shown in FIGURE 6, illustrating the location of the over-all center of gravity for the combined fuselage and wing structure.

FIGURE 11 is a view of the same structure shown in FIGURE 10 after jettisoning of the boom, the original position of which is indicated in broken lines, and further showing how such jettisoning affects shifting of the center of gravity of the combined boom and wing (indicated in broken lines in FIGURE 11) to the center of gravity of the wing per se (indicated in solid lines in FIGURE 11).

FIGURE 12 is a plan view, partially broken away, of a wing structure of the type shown in FIGURE 5, showing an alternate mechanism for controlling the yawing or steering of the wing by shifting its center of gravity span-wise of the wing.

Figure 13:
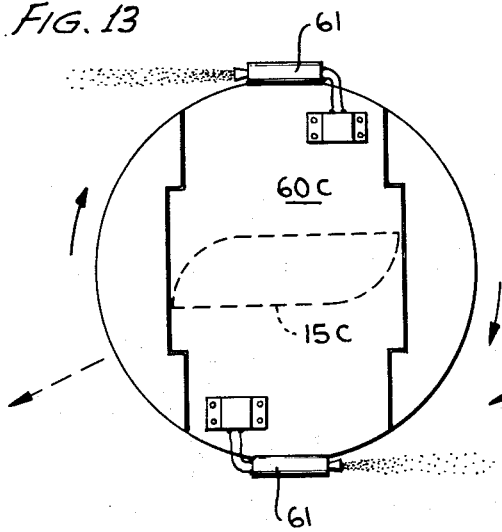

FIGURE 13 is an end elevation of the wing structure of FIGURES 1, 2 and 3 showing the addition of rockets for imparting power rotation to the wing.

FIGURES 14 and 15 are similar enlarged diagrammatic views of the aerodynamic yaw control means or spoilers and their actuating mechanism, shown diagrammatically as in FIGURE 2, but respectively showing in these views the alternate actuation of the spoilers at opposite wing tips for causing the wing to yaw in relatively opposite directions.

Figure 16:
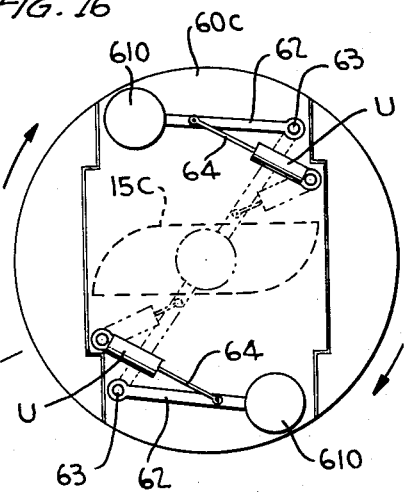

FIGURE 16 is an end elevation similar to FIGURE 13 showing diagrammatically the use of flyball weights for storing energy for power driving purposes.

Figure 17A:
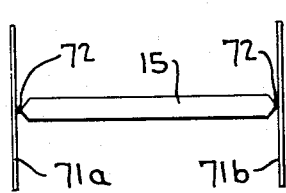
Figure 17B:
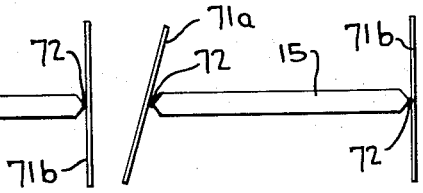
Figure 17C:
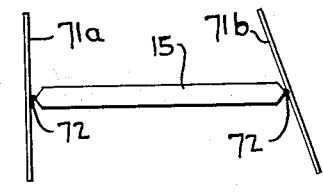

FIGURES 17A, 17B and 17C are diagrammatic plan views of a further modification of the invention in which the different figures show the controls in different operative positions.

Figure 18:
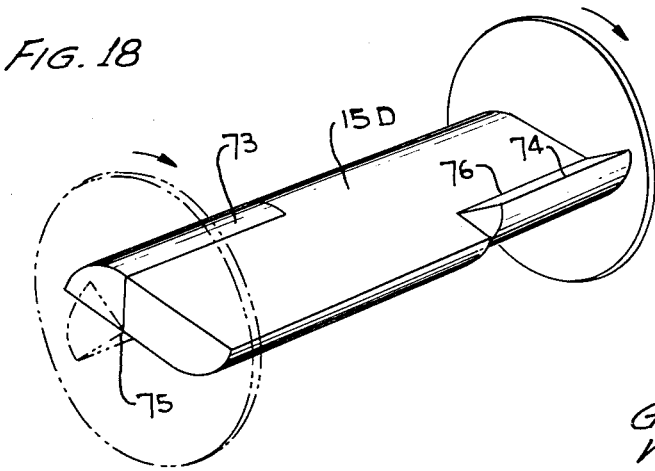

FIGURE 18 is a perspective view of a still further modification of the wing rotor per se.

In the following detailed description of specific embodiments of the invention, various parts thereof will be referred to by specific terminology. It should be understood, however, that such specific terminology is merely by way of exemplification, and is by no means intended to limit the scope of the invention.

Thus, referring in detail to the accompanying drawings, and first referring to FIGURES 1, 2 and 3 respectively, these show the invention in a form in which it is adapted for transporting by and launching from a generally conventional cargo aircraft, for air-to-ground delivery of cargo which may be housed within the hollow interior of each wing rotor. While especially adapted for successful launching at extremely low altitudes, the structure here shown may be successfully launched from substantial altitudes if desired.

In FIGURE 1 there is shown simply the rearwardly opening rear-end portion of the cargo fuselage or cabin 10 of a conventional air cargo transport aircraft equipped with hinged doors 11—11. The ramp or floor 12 extends longitudinally of the body or fuselage 10 to the opening and preferably there are provided within the aircraft body 10 a pair of relatively parallel rigid launching rails 13—13 for use in rotatably supporting and pre-spinning the wing rotors of the invention in proper direction as they are launched rearwardly from the aircraft.

The wing rotors 15, a plurality of which may be carried by and successively launched from the aircraft 10, may be fabricated from any suitable material such as plywood, plastic, or metal, or, if desired, may be adapted for formation from a flexible, foldable fabric, adapted for pneumatic inflation in accordance with known techniques, so that such rotors may be stored in relatively small space in folded condition, to be inflated and launched as required.

In the embodiment shown, the wing rotors 15 are of uniform cross-sectional area throughout their span, being of a suitable airfoil shape such as shown in FIGURE 3, such as has been found to autorotate about a span-wise axis at its mid-chord, and to have inherent stability. The hollow interior of the wing rotor 15 provides cargo storage space for any of various types of cargo, and may obviously be adapted to define a tank for reception of liquid or fluid cargoes, and having a removable closure cap.

For preventing end-wise or side slippage of the wing structure in flight, there are provided, preferably at its wing tips, end plates 16—16, which are affixed to the wing tips in planes parallel to each other and normal to the rotational axis of the wing rotor. In the instant embodiment these end plates 16—16 are in the form of circular discs so that they may function also as wheels to facilitate maneuvering of the devices on the ramp 12 or on any other comparatively flat surface.

Rotors 15 might be launched simply by rolling them rearwardly along the ramp 12 and outwardly through the open rear-end of the aircraft 10. But it is desirable that they be prerotated or spun in the proper direction simultaneously with their launching in order to impart initial stability and lifting capacity to them. For this purpose, the end-plates or discs 16 are each provided with annularly grooved drums 17 whose axes are coincident with the rotational axis of the wing rotor. These grooved drums or sheaves 17 are positioned for reception within their grooves of the launching rails 13, the height of which is such as to support the peripheries of the end-plates 16 somewhat above the ramp 12 so that they may freely rotate as they are rolled along the launching rails 13. It will be seen that this rolling action during rearward launching of the rotors tends to pre-spin them at comparatively high speeds in the same direction of rotation which will be thereafter imparted to them by the air stream. In other words, they are caused to rotate in the direction indicated by the arrows in FIGURE 1 so that the leading edge of each wing is ascending while its trailing edge is descending.

In the present embodiment, the means for laterally steering or controlling the yaw of each wing is of an aerodynamic type, consisting simply of ailerons 18—18 which preferably are sections or segments of the respective end-plates 16 and hinged thereto, as at 19, so that they may be selectively swung in a manner to cause the wing rotor as a whole to yaw or swing about the wing tip having the higher drag.

Since the wing rotor such as here shown is preferably of the unmanned type, it is provided with suitable remotely controllable means for alternately swinging the ailerons of the respective wing tips as necessary for controlling the yaw. One suitable such means, hereinafter described, is adapted for control by radio, either from the ground or from the air.

Referring to FIGURES 14 and 15, such means comprises a linkage consisting primarily of a floating lever 23, the opposite ends of which are operatively connected to the respective ailerons 18—18 by rigid links 24—24.

Each such link 24 is pivotally connected to its associated aileron 18 as by means of the pivot 25. Links 24 are similarly pivotally connected at 26a and 26b to opposite ends of the floating control lever 23. It should be observed that the pivots 25–26a and 25–26b for each link 24 define rotary axes which are parallel to the axes of the hinged connections 19 of their associated ailerons 18, and that such axes are all parallel to each other.

At its medial portion, floating control lever 23 is pivotally connected at 27 to one end of a rigid link 28; the other end of which is pivoted on the crank pin 22 at the free end of crank 21 of a radio signal responsive servo-motor 20. The servo-motor 20 is of a reversible type capable of causing angular movement of the crank arm 21 in either a clockwise or a counterclockwise direction from its neutral or twelve o'clock-position (midway between the positions illustrated in FIGURES 14 and 15 respectively).

The central lever 23 is supported in any suitable manner for displacement either to the right or to the left, as depicted in FIGURES 14 and 15 respectively, through forces transmitted to it from the servo-motor 20, through the crank arm 21 and link 28. In its neutral position, in which both of the ailerons 18 controlled by it will lie in the planes of their respective end-plates 16, the opposite extremities of the central lever 23 abut against stops 31 and 32 on opposite sides thereof respectively. Thus, in the event the wing rotor with which the mechanism of FIGURES 14 and 15 is associated, is moving generally in a direction as indicated by the arrow 33 in FIGURE 14, the central lever 23 and its associated ailerons 18—18 will lie in neutral position. If it is desired to cause the wing to yaw to the left as seen in these figures, this may be accomplished by radio control of the servo-motor 20 to angularly move the crank 21 in a clockwise direction, thereby causing the connecting link or rod 28 to displace the medial portion of the lever 23 toward the right as in FIGURE 14. Since the lower end of the lever 23 abuts against the stop 32 on its righthand side, the righthand aileron 18 controlled by this end of the lever will remain in its neutral position, while lever 23 pivots to the right about its point of abutment with stop 32. The other end of the lever 23, thus is free to swing away from the stop 31, which is on its lefthand side, and thus acts through the link 24 to swing its associated aileron 18 on the lefthand wing tip to move the latter angularly about the pivot 19 so that it will extend at least partially transversely to the direction of flight indicated by the arrow 33. Its partially transverse disposition within the air stream will effect a retarding or dragging action on its associated wing tip, causing the wing rotor thus to yaw to the left.

Conversely, if it is desired to cause the wing rotor to yaw to the right, the radio control device is actuated to cause the servo-motor 20 to angularly move the crank 21 toward the left or in a counterclockwise direction as shown in FIGURE 15, thereby exerting a pull through the connecting link 28 to displace the center of the lever 23 toward the left. Movement in this direction of the forward end of the lever 23 is limited by its engagement with the stop 31, and such engagement defines a pivot about which the lever 23 swings to the left, as shown in FIGURE 15 and away from the stop 32, thereby swinging the righthand aileron 18 at least partially across the airstream to cause the wing rotor to yaw toward the right.

The links 23A and 23B exemplify means for supporting the lever 23, though obviously these might be replaced, as for instance by suitable means (not illustrated) for positively supporting and guiding the pivot 27 for displacement along a predetermined path generally aligned with the link 28. In the specific arrangement of floating support as afforded by the links 23A and 23B, respectively, the lever 23A is pivoted at 33 to bracket 34 which, as shown in FIGURE 16, is affixed to and mounted on the inner wall or face of the wing rotor 15 to support the lever 23A for movement generally parallel to but spaced from and free of the wing structure. The opposite end of the lever 23A is connected by the pivot 26a, earlier described, to the corresponding end of control lever 23. The corresponding forward end of lever 23b, as is best shown in FIGURE 14, is pivoted at 35 to the inner wall of the wing, while the rear end or extremity of lever 23b, as shown in FIGURE 16, is pivoted at 26b to the floating lever 23.

The several pivots 26a, 26b, 33 and 35 are so located that in the natural position of the lever 23 in which it is in registry with the respective supporting levers 23a and 23b, the axis of pivot 35 will be aligned with the axis of the pivotal connection 26a between the levers 23 and 23a, while the axis 33 of the lever 23a will be aligned with the axis 26b of the pivotal connection between levers 23 and 23b.

Although it will suffice to provide but a single aileron 18 at each tip of the wing rotor for control in the manner above described, it is desirable (as shown in FIGURES 1–3) to provide a second set or pair of ailerons 18—18 pivoted at 19' to their respective end-plates 16, and adapted for control through a radio controllable servo-motor 20' independently of the ailerons 18. The ailerons 18' and their control means 20' and associated linkages may be indentical with the structure above described in connection with ailerons 18.

The duplication of the ailerons 18 and their control means by the similar spoiler flaps 18', with similar but independently controllable control means 20' provides greater control capabilities, and also makes possible utilization of such ailerons for drag modulation purposes to vary the blide path angle and hence the rate of the descent without necessarily producing yaw of the wing rotor aircraft. To this end it will be apparent that simultaneous actuation of both sets of spoiler flaps 18—18 and 18'—18' will exert a balanced drag on the wing rotor craft aligned, as a whole, with its direction of flight to retard its movement through the airstream, with corresponding increase in the steepness of its glide path angle. So long as the flaps 18 and 18' are symmetrically positioned, the craft may continue its direction or path of flight without yawing or turning. However, by appropriately unbalancing or differentiating between the angular positions of the respective flaps 18 and 18', there may be achieved a simultaneous control of the glide path angle and also of the steering of yawing of the craft.

In the operation of the invention as illustrated in FIGURES 1, 2 and 3, it will be apparent from the foregoing description that a supply of the wing rotors or wing rotor craft 15 may be transported in an aircraft body 10 to be launched over any selected target area to which the craft is to deliver the cargo. They may be launched successively when the aircraft arrives in the vicinity of such area. The rearward rolling of the wing rotors along the launching rails 13, incident to their launching from the body 10, will cause them to be pre-spun in the proper direction to impart a lifting force or action to each rotor 15 and to stabilize same immediately upon its reception in the airstream. Accordingly, the rotors will immediately be controllable in response to radio signals which may conveniently be transmitted under the control of an operator or observer who may either be airborne or positioned on the ground at a location permitting observation both of the target area as well as of the incoming wing rotor craft. By suitable control of their yaw as well as of their rate of descent, the wing rotor craft may be caused to land with considerable accuracy upon the desired target area. The normally relatively slow rate of descent resulting from the high lift capabilities of the autorotating wing structure will considerably reduce the likelihood of damage either to the craft or its cargo, and make possible their launching at extremely low altitudes.

Moreover, if desired the landing may be cushioned by forming the end-plates 16 of a crushable or of a resiliently flexible or yieldable nature. If desired, the radio controls may be omitted and the ailerons 18 and 18' preset prior to launching, particularly at low levels.

In the embodiment of the invention illustrated in FIGURE 4 of the drawings, the wing rotor 15a is identical in all respects, including its interior structure and control mechanisms, with that above described and shown in FIGURES 1 through 3 inclusive, except that the rotor 15a in this case is adapted to be towed, and also is adapted to carry a suspended hollow cargo 37.

In order to thus adapt the wing rotor aircraft 15a, the grooved drums or sheave wheels 17, such as employed in the embodiment of FIGURES 1 through 3, are replaced by shafts such as 38 journaled on or through the end-plate 16 for free rotation about an axis which coincides with the axis about which the wing rotor 15a autorotates.

Rigidly attached to the opposite ends of the shaft 38 are rigid radial arms 40 and 41 respectively, the free ends of which preferably project radially somewhat beyond the peripheries of the plate members 16 and are rigidly interconnected by struts 39. The free ends of the arms 40—40 are connected to flexible towing elements 42—42, respectively, which in turn are coupled to a towing ring 43 to define a bridle which is releasably coupled by the ring 43 to the trailing end of a tow cable 44, connected to the towing aircraft.

It will be apparent that the towing force or action transmitted through the bridle members 42—42 will normally cause the radial arms 40—40 to assume a position generally in the plane of the bridle members 42, thus causing the angularly related arms 41—41 normally to assume depending positions. Flexible suspension cables or elements 45, fixedly connected to the cargo body 37, serve to suspend the latter beneath the wing rotor 15a.

In view of the comparatively high drag and low airspeed of the wing rotor 15a, it is desirable that the tow plane employed in conjunction with it should comprise a helicopter.

In the operation of such a wing rotor, during takeoff of same from the ground, both the wing rotor 15a and its associated cargo body 37 normally will be supported on a separable wheeled carriage or dolly which is drawn forward over the ground with them until they become airborne. Inasmuch as the details of such a wheeled carriage constitute no part of the present invention, the latter is not illustrated herein.

In addition to their functions earlier pointed out, the radial arms 40 and 41 at each end of the wing rotor 15A will have their free ends projecting beyond the peripheries of the end plates 16 sufficiently to rotatably support the wing rotor 15A so that it may autorotate on the take-off carriage about the axis defined by shaft 38, and thus acquire high lift capability before leaving the take-off carriage. In so doing, it will receive an assist from the helicopter rotor downwash, providing, of course, that the helicopter at takeoff is properly positioned.

A wing rotor can thus be towed to the vicinity of its desired landing area or target area and released from the tow cable, following which it may be guided into the target area by radio command from either the air or the ground, or conceivably from an airborne radio and operator carried within the suspended body 37. Obviously, in lieu of the housing or body 37, the suspension cable 45 might be attached directly to an object to be transported, such as a vehicle.

In order that the wing rotor of the invention might be adapted readily for towing at high speeds, by conventional aircraft, for release over the target area, to thereafter operate either as a fixed wing aircraft or as a wing rotor, it is an extremely important feature of the invention to adapt the wing rotor for these functions and for selective convertibility while in free flight, from one mode of operation to the other.

Suitable embodiments of aircraft capable of conversion in this manner are illustrated in FIGURES 5 through 11 of the accompanying drawings.

In FIGURE 5, the wing rotor 15B per se is essentially similar to that disclosed in FIGURES 1 through 3 inclusive, being of hollow configuration, both to carry a cargo therewithin, as well as to provide a housing for radio responsive control mechanisms such as illustrated in FIGURES 14 and 15. In this embodiment, however, the end-plates 16B have a somewhat different or oval configuration than those of the preceding embodiments and are each provided with but a single aileron or hinged flap 18B adapted for control by a single servo-motor and linkage such as illustrated in FIGURE 14 for yaw control purposes.

The radio signal responsive control means for the spoilers 18B of FIGURE 5 may be adapted, in known manner, to actuate them alternately, as in FIGURES 14 and 15 for yaw control purposes, and may also, if desired, be adapted in obvious manner to selectively operate them simultaneously for drag modulation purposes.

It has been found in accordance with the invention that the wing structure of generally conventional airfoil configuration and adapted to operate as the fixed wing of an aircraft having its center of gravity located substantially forwardly of the midpoint of the chord, may be caused to autorotate if the center of gravity is shifted rearwardly to a position about 50% or midway of the chord. This quality is utilized for achieving the convertible fixed wing, autorotating wing or wing rotor, in FIGURE 5 and subsequent figures.

Thus in FIGURE 5, the wing 15B is of a generally conventional airfoil section, as indicated in FIGURE 7, and is so arranged that the center of gravity of the wing per se, when loaded, will be located approximately midway or at 50% of its chord so that the wing per se will automatically rotate about such center of gravity when in free flight by itself.

In order to shift the center of gravity forwardly sufficiently to cause the wing 15B to function in the manner of a fixed wing, it has been found desirable to associate the wing in selectively separable or detachable manner with a jettisonable rigid boom 47 which projects substantially in advance of the leading edge of the wing structure and, at its free forward end, is weighted as at 48. It will be obvious that this forward spacing of the weighted portion 48 of the boom, by virtue of the mechanical advantage thus obtainable, makes possible the desired forward shifting of the center of gravity in the combined wing rotor and boom 47, by the use of a substantially smaller weight than would be necessary for the same purpose, were the weight contained within the wing structure itself. However, it is to be understood that the inventive concept includes such weight shifting within the wing structure, as for instance by radio controllable means of conventional nature. By thus minimizing the mass of the boom 47 at its weighted end 48, it is made possible to preserve a greater amount of the lifting capacity of the wing for load carrying purposes.

In order to enhance the stability of the convertible structure, the boom 47 preferably extends rearwardly of the trailing edge of the wing 15B, and carries a vertical tail or fin 48 as well as a horizontal tail surface or aerodynamic stabilizer S.

For selectively detaching the boom 47 from the wing structure 18B to convert the latter from operation as a fixed wing to operation as a wing rotor, any of the various detachable connecting means capable of remote control, as for instance radio control, may be employed. One suitable such means illustrated in FIGURES 7 and 8, consists in providing the wing with depending relatively spaced brackets 50—50 having their bases respectively secured to the under surface of the wing as by the rivets 51, shown in FIGURE 8. The wing seats on the boom 47, which preferably is provided with a seat 52 shaped to conform with the lower face of the wing structure, with the spaced brackets 50—50 on opposite sides of and loosely receiving the boom 47. An explosive bolt, generally designated 53, has its shank extending transversely through and loosely received by the relatively spaced brackets 50—50, and the interposed boom 47. The explosive head or portion 54 of the bolt is provided with ignition wires 55 adapted for connection to and control by a conventional radio signal responsive igniting device, so that the explosive head 54 may be selectively detonated to disassociate the shank of the bolt 53 from the interconnected parts 47 and 50, to result in jettisoning of the boom 47.

In addition to providing for forward shifting of the center of gravity of the aircraft and for supporting the tail elements 48 and S, the boom 47 also functions as a skid for facilitating takeoff of the aircraft as a towed fixed wing glider from ground level. Also the forward end of the boom serves as a convenient means for connection of the tow line 56. In this convertible structure, the great reduction in drag of the wing when operating as a fixed wing, as in FIGURE 5, permits its travel at a high speed and thus adapts it for towing by means of a conventional high speed aircraft. To minimize its drag, it is desirable that the cargo be carried within the hollow wing structure 15B, the cargo compartments of which are contained beneath the closures or doors 49.

In the operation of such a convertible fixed-wing-to-wing-rotor structure, the load carrying or wing structure 15B, when affixed to the boom 47, may be towed behind a suitable aircraft to the vicinity of the target area, whereupon the tow line may be released so that the glider may operate as a free flight glider silently approaching its landing target. During such free flight, yaw control and lateral steering of the aircraft may be achieved through radio control of the flaps 18B in the same manner as when the wing 15B is in autorotation, as heretofore described in connection with the embodiment shown in FIGURES 1, 2 and 3.

The embodiment of the invention illustrated in FIGURE 6 differs from that of FIGURES 5, 7 and 8 only to the extent that in FIGURE 6 the wing rotor 15C is shaped to have a flying-wing type configuration, being of maximum chord at its mid-portion and tapering toward either end, in order to achieve structural strength. Also in this embodiment, the end-plates 16C are each provided with a pair of hinged flaps 18C and 18C', adapted for operation by remotely controlled mechanism, preferably contained within the hollow wing structure 15C, for instance in the identical manner disclosed in connection with FIGURES 1, 2 and 3, although other modes of remote control by conventional control mechanisms will be readily apparent to those skilled in the art. Cargo may be loaded and unloaded through the hinged doors 49C.

Except for the variations to which attention has been specifically directed, the structure shown in FIGURE 6 and the mode of operation thereof will be identical to those above described in connection with FIGURE 5.

Thus, referring by way of example to FIGURES 9A through 9D for illustration of the mode of operation of the aircraft shown in FIGURE 6, FIGURE 9A illustrates such an aircraft functioning as a fixed wing glider in free flight, following release of its tow line from the towing aircraft somewhere in the vicinity of the target landing area. In such free flight, it is apparent that the craft may be steered by remote radio control of the ailerons 18C, 18C' to increase the drag at one wing tip relative to the other in the manner earlier explained in connection with the yaw control of the same type of wing structure when in autorotation. Thus with the craft functioning as a fixed wing glider, it may approach the target area swiftly and silently, and at desired point in its approach to the target area, the boom 47 may be jettisoned under the control of a radio signal so that the wing structure 15C may automatically commence its autorotation regime.

By reference to FIGURES 10 and 11, it will be apparent that as long as the boom 47 remains affixed to the wing structure 15C, the weighted forward end 48 of the boom will result in positioning the center of gravity of the overall aircraft structure at approximately the location 58 which, as indicated diagrammatically in this figure, is located rearwardly of the leading edge of the wing only about one-fourth of the chord of the wing. The location of the center of gravity 58 will be so selected with respect to the characteristics of the particular wing configuration as to stabilize the latter for efficient flight as a fixed wing.

By reference to FIGURE 11, it will be apparent that the location of the center of gravity 58 (designated by broken lines in FIGURE 11) of the aircraft, prior to jettisoning of the boom 47, is located substantially forwardly of the center of gravity 60 of the wing structure per se, about which the wing tends to autorotate automatically immediately upon jettisoning of the boom.

FIGURE 9B illustrates the wing structure 15C just as the weighted boom 47 is jettisoned by explosion of the bolt head 54 to effect shifting of the center of gravity rearwardly from the location 58 to the location 60 (in FIGURE 11) to initiate the autorotation of the wing structure by aerodynamic action.

After such autorotation has commenced, the flight of the autorotating wing or wing rotor may continue to be controlled through remote control of the flaps 18C and 18C' in the manner heertofore explained in connection with FIGURES 1, 2 and 3 to effect steering or yaw control whereby to direct the autorotating wing rotor toward the target area. The steepness of the glide angle may be increased to the extent desired in order to avoid overshooting of the target area, by simultaneously actuating ailerons or flaps at both tips of the wing.

FIGURE 9D shows the craft as it is landed in the target area, at which time it will be noted that the direction of autorotation of the craft and its disc-like end-plates 16C is such that when these engage the ground in the manner of landing wheels, their reverse rotation will exert a sharp breaking action to bring the craft to a stop within a comparatively short space.

In addition to increasing the glide angle which is attainable by control of the flaps 18, 18', 18B or 18C, 18C' in the various embodiments of the invention specifically described, it is possible also to achieve a decrease in the glide angle, or even powered flight, by the use on the rotating wing structure of power rotating means or of means for augmenting and speeding up its rotation and thereby increasing its lifting action. Such augmenting or lift-modulating means or mechanisms, as will be understood, will be of types which are remotely controllable by radio signals or the like. For this purpose, and as illustrated in FIGURE 13, it has been contemplated to employ such known power drive elements as rockets 61 affixed to the respective end-plates 60C of each wing structure at radially outwardly spaced locations with respect to the axis about which the wing structure rotates and oriented to discharge their fluid or gaseous jets tangentially and counter to the direction of rotation. Ignition of the rockets in such case would be under radio control in the same manner as the explosive bolt head 54 and as is conventional. To the same end, there might be employed in place of rockets, jet nozzles mounted on the end discs 60C and directed tangentially, to discharge jets of gas from a pressurized container within the wing structure 15C, under the control of a conventional radio controlled servo valve.

A further advantageous and specifically novel means for modulating the lift by augmenting the rotational forces acting on the autorotating wing is illustrated in FIGURE 16 of the accompanying drawings, in which weights such as 610 are supported in the manner of fly weights at the outer ends of radial arms 62, which are pivoted to the wing structure at 63. These arms simply exemplify a suitable means of mounting the weights 610 for radial movement toward or away from the axis about which the wing structure autorotates. It is to be understood, of course, that all of the weights 61 are disposed and adapted for movement symmetrically to the said rotational axis in order to maintain the wing in balance. The arms 62 which support the weights are normally extended radially to space the weights 61 at maximum distance from the rotational axis of the wing, whereby their rotation with the autorotating wing will cause them to move at maximum peripheral speed, thus storing energy for use selectively in a manner to augment the rotational speed of the wing.

In order to thus utilize their stored energy, it is necessary only to move the said weights 61 radially inwardly toward the rotational axis of the wing. Such radial inward displacement or movement will obviously decrease the length of the circular path through which the weights rotate, while the inertia of the said weights will nevertheless result in their tendency to maintain their peripheral velocity, with resulting increase in the angular velocity, both of the weights 61 and of the wing structure 15C with which they rotate. The inertia of the weights will thus tend to increase the rotational speed and therefore the lift of the wing 15C until the stored energy is absorbed by the resistance of the air to such increased rotational speed. Obviously, after the weights 61 have thus been moved radially inwardly, their radial outward movement may be utilized if necessary to decrease the rotational speed and accordingly the lift of the wing structure for increasing the steepness of the glide angle. Inward movement of the weights 61 may be selectively produced by pneumatic cylinder and piston units (in FIGURE 16) connected to the radial arms 62 by links 64 respectively, under control of a radio signal responsive servo-valve (not shown) which in turn is adapted when actuated to admit compressed air or gas from a suitable compressed gas tank within the hollow wing.

In FIGURE 12, there is diagrammatically indicated an alternative method of controlling the yaw or steering of the autorotating wing structure, consisting in the provision of a weight, diagrammatically illustrated as 65, which is guided in any suitable manner, as for instance by sliding movement along the guide bar 66, along the rotational axis of the wing for span-wise or axial displacement from its normal position at the center of the span of the wing. It is contemplated that shifting of the weight 65 may be achieved by such means as diagrammatically exemplified by the radio signal controllable servo-motor 67, the output element of which constitutes a crank arm 68 adapted for selective rotary movement in either direction from the neutral position in which it is illustrated in FIGURE 12. The free end of this crank arm 68 is linked by the pin and slot connection 69 to the weight 65 so that the weight 65 may be adjusted laterally along its guide rod 66 in either direction from its neutral position.

Thus, by shifting the weight 65 in either direction from its neutral balanced position at the center of the wing span, the corresponding shift of the center of gravity span-wise of the wing will result in a banking of the wing which may be relied upon for steering functions. For instance, if the weight 65 is displaced to the right toward the broken line position A indicated in FIGURE 12, and assuming that the wing is traveling forwardly in the direction indicated by the arrow 70 in FIGURE 12, the resulting unbalancing of the wing will cause the wing to bank toward the left. Though such unbalancing might perhaps be expected to cause the wing to bank to the right, it has been found in actual practice that the opposite result, namely, banking of the wing toward its lighter end, will in fact result. This particular unexpected result is believed to be caused by coaction between the gyroscopic and aerodynamic forces coacting on the rotating wing.

FIGURES 17A, 17B and 17C illustrate, in different operative positions, a modified form of aerodynamically functioning yaw control means, in the form of rigid discs 71a and 71b, each pivotally connected at 72 to one tip of the wing for tilting about a diametrical axis. In FIGURE 17A, the discs are disposed for straightforward flight, in parallel planes.

Assuming the straightforward flight to be toward the upper edge of the sheet, FIGURES 17B shows the left hand disc 71a tilted about its axis 72 to cause a yawing of the wing toward the left, the other disc 71b remaining in its original position.

For achieving a yawing toward the right, the disc 17a is restored to its neutral position parallel to the line of flight, as in FIGURE 17C, while the disc 71c is tilted about its pivotal connection 72 to extend diagonally to the span of the wing.

A still further form of aerodynamic means for controlling the yaw is shown in FIGURE 18, in the form of ailerons 73 and 74 respectively hinged to the wing 15D for angular adjustment about pivotal connections to the wing at 75 and 76 respectively, about axes which extend parallel to the span of the wing. During forward flight, it is to be understood that both ailerons 73 and 74 will be positioned, in the manner of aileron 73 in FIGURE 18, to function as a fixed portion of the wing 15D. By selectively adjusting either aileron about its pivotal connection, and out of the planes of the opposite wing surfaces, there is created an aerodynamic unbalance which may be utilized for yaw control purposes.

In FIGURE 18, it will be noted that the end discs 16D are retained for stability in flight and for their functions in supporting and maneuvering the wing on the ground, or in landing and take-off. However, each such disc 16D is of substantially unitary rigid construction, and rigidly affixed to the wing tip in a plane transverse to the wing span.

Having thus described our invention, we claim:

1. A convertible-in-flight aircraft, comprising a wing conformed for autorotation about a span-wise axis transverse to its line of flight and having its center of gravity located to induce autorotation of said wing by aerodynamic action incident to its motion through the air along said line of flight; stabilizing means carried by said wing for causing same to fly as a fixed wing, and means for selectively rendering said stabilizing means inoperative to initiate autorotation of the wing.

2. A convertible-in-flight aircraft, comprising a wing conformed for autorotation about a span-wise axis transverse to its line of flight and having its center of gravity located to induce autorotation of the wing by aerodynamic action incident to its movement through the air along said line of flight, and means carried by said wing for selectively effecting a shift of its center of gravity along said line of flight between a predetermined forward position in which the wing is stabilized for flight as a fixed wing and a predetermined rearward position in which the wing is caused to autorotate incident to its movement through the air.

3. A convertible-in-flight aircraft, comprising a wing conformed for autorotation about a span-wise axis transverse to its line of flight and having its center of gravity located to induce autorotation by aerodynamic action incident to its movement through the air along the line of flight, and means carried by said wing for selectively effecting a shift of its center of gravity, said means comprising a jettisonable weight carried by said wing sufficiently forwardly of said center of gravity of the wing to stabilize the wing for efficient flight as a fixed wing, and means for selectively jettisoning said weight while the aircraft is in flight to initiate autorotation of the said wing.

4. A convertible-in-flight aircraft, comprising a wing conformed for autorotation about a span-wise axis transverse to its line of flight, and having its center of gravity located to induce autorotation incident to its movement through the air along the line of flight, in which said stabilizing means comprises an aerodynamic stabilizing surface for resisting autorotation of the wing, and selectively operable means for jettisoning said stabilizing means to render the same inoperative.

5. A convertible-in-flight aircraft as defined in claim 1 in which said stabilizing means comprises a rigid boom normally affixed to said wing, said boom including an aerodynamic stabilizing surface arranged to resist autorotation of the wing, and in which said means for selectively rendering said stabilizing means inoperative comprises a releasable connection between the boom and the wing, and means for selectively releasing said connection for jettisoning the boom.

6. A convertible-in-flight aircraft, as defined in claim 5, in which said boom projects substantially in advance of the leading edge of said wing, a weight being carried by said boom and located sufficiently in advance of the center of gravity of the wing as to dispose the center of gravity of the aircraft substantially forward of said wing's center of gravity.

7. A convertible-in-flight aircraft, comprising a wing conformed for autorotation about a span-wise axis transverse to its line of flight, and having its center of gravity located to induce autorotation by aerodynamic action incident to movement of the wing through the air along said line of flight; jettisonable means carried by said wing for shifting said center of gravity forwardly sufficiently to stabilize said wing for flight as a fixed wing, and selectively operable means carried by said aircraft for jettisoning said jettisonable means.

8. A convertible-in-flight aircraft, comprising a wing conformed for autorotation about a span-wise axis transverse to its line of flight, and having its center of gravity located to induce autorotation of the wing by aerodynamic action arising from its movement through the air along its line of flight, and stabilizing means detachably connected to and carried by said wing for causing it to function as a fixed wing, said stabilizing means comprising a rigid boom detachably affixed to said wing and projecting forwardly in advance thereof, a weight carried by said boom sufficiently forwardly of the center of gravity of the wing to effect a shifting of the center of gravity of the said aircraft sufficiently forwardly of said wing center of gravity to stabilize the wing for fixed wing operation, and selectively operative means for releasing said connection whereby to jettison said boom and to initiate autorotation of the wing.

9. A convertible-in-flight aircraft as defined in claim 8 in which said boom extends beneath said wing and is shaped to function as a skid for landing and take-off purposes.

10. A convertible-in-flight aircraft as defined in claim 8, in which said boom is provided with means for connecting a tow cable thereto.

11. A convertible-in-flight aircraft as defined in claim 1, including means carried by said wing for rotation therewith for selective operation during both of its modes of operation as a fixed wing and as an autorotating wing to selectively cause said wing to yaw about either wing tip.

12. An aircraft as defined in claim 11 in which said yaw control means comprises ailerons, means operatively supporting said ailerons from the wing on opposite sides of the midpoint of its span, and radio controlled means for selectively operating said ailerons from a remote location.

13. A convertible aircraft as defined in claim 11 including ailerons, means operatively supporting said ailerons from the wing for rotation therewith, and means for actuating said ailerons to exert a drag aligned with the flight path of said wing, whereby to retard its movement and thereby to reduce its lift.

14. A convertible-in-flight aircraft as defined in claim 12 including drag means, means operatively supporting said drag means from the wing for rotation with the wing, and remote control mechanism for actuating said drag means to reduce the forward velocity of said wing through the air whereby to increase its angle of descent.

15. A convertible aircraft as defined in claim 1 including means carried by and rotatable with the wing for selectively shifting the center of gravity of said aircraft in either direction along said spanwise axis of the wing from a normal location mid-way of the wing span.

16. An aircraft comprising a wing conformed for autorotation about an axis extending span-wise thereof and transversely to its line of flight, the center of gravity of said wing being located to induce autorotation of the wing incident to its movement through the air along said line of flight, aerodynamic means carried by said wing for resisting side slippage thereof, and yaw control means carried by said wing for rotation therewith, said control means including selectively operative controls responsive to radio signals.

17. An aircraft as defined in claim 16 in which said yaw control means comprises ailerons carried by the wing and spaced equidistantly along its span from the center thereof, and means for actuating said ailerons for steering said aircraft.

18. An aircraft comprising a wing conformed for autorotation about an axis extending span-wise thereto and transversely to its line of flight, the center of gravity of said wing being located to produce autorotation of the wing incident to its movement through the air along said line of flight, means carried by said wing for resisting span-wise movement thereof during flight, independently operable yaw control elements movably connected to said wing adjacent its respective tips and carried by said wing for rotation therewith, and remotely controllable means for independently and selectively actuating said yaw control elements.

19. An aircraft comprising a wing conformed for autorotation about an axis extending span-wise thereof and transversely to its line of flight, the center of gravity of said wing being located to cause autorotation of the wing by aerodynamic action incident to its movement through the air, aerodynamic means carried by said wing for resisting its span-wise displacement during flight, weights carried by said wing for rotation therewith concentrically to its said axis of autorotation, said weights normally being spaced from said axis, and means selectively operable for moving said weights inwardly toward said axis to increase the rotational speed and lift of the wing.

20. A rotary wing aircraft comprising a wing conformed and balanced for autorotation about an axis extending span-wise thereof and transversely to its line of flight, said wing extending rectilinearly throughout its entire length in the direction of its span, aerodynamically acting means carried by said wing for resisting span-wise movement of the wing through the air, selectively operative yaw control means carried by said wing on opposite sides of the mid-portion of its span, means for operating said yaw control means for exerting an unbalanced drag on said wing for steering purposes, drag modulating means carried by said wing for rotation therewith for reducing its line of flight velocity and thereby decreasing its lift, and means carried by said wing for rotation therewith and selectively operable for augmenting the rotational speed of said wing about its said spanwise axis.

21. An aircraft as defined in claim 20, in which said means for augmenting the rotational speed of said wing comprise weights normally equidistantly spaced from said rotational axis, and selectively operable means for drawing said weights simultaneously toward said axis.

22. An aircraft as defined in claim 20, in which said means for augmenting the rotational speed of the wing about its span-wise axis comprises reaction means spaced radially from said axis of rotation and adapted to discharge circumferentially directed jets of gas reversely to the direction of rotation.

23. A wing rotor aircraft comprising a wing conformed for autorotation about a span-wise axis transverse to its direction of flight, said wing being balanced for autorotation incident to aerodynamic action arising from its movement through the air along said line of flight, means carried by said wing for resisting span-wise movement thereof during flight, ailerons and means supporting said ailerons at opposite tips of said wing for movement between operative and inoperative positions and radio signal controllable means for selectively and alternately operating the respective ailerons, comprising a servo-motor having a crank selectively driven thereby for rotary adjustment in either direction, a floating lever, means floatingly supporting said lever for displacement transversely to its length, means operatively linking the opposite ends of said floating lever to the respective ailerons, stops for limiting said transverse displacement of the respective ends of the said lever from opposite directions to predetermined neutral positions in which said ailerons are inoperative, said crank being linked to the mid-point of said lever whereby to displace same selectively in either direction transverse to its length, such movement of the mid-portion of the lever in either direction, causing the lever to swing about one of said stops and away from the other stop, whereby to actuate one only of said ailerons at a time.

References Cited by the Examiner

UNITED STATES PATENTS

| | | | |
|---|---|---|---|
| 2,004,885 | 6/1935 | Yanchus | 244—35 |
| 2,501,442 | 3/1950 | Donaldson | 244—153 |
| 2,681,775 | 6/1954 | Orati | 244—39 |
| 3,029,043 | 4/1962 | Churchill | 244—39 |

MILTON BUCHLER, *Primary Examiner.*

L. C. HALL, *Assistant Examiner.*